United States Patent
Nakamura et al.

(10) Patent No.: US 9,330,728 B1
(45) Date of Patent: May 3, 2016

(54) SPINDLE MOTOR AND DISK DRIVE APPARATUS

(71) Applicant: Nidec Corporation, Kyoto (JP)

(72) Inventors: Akiyoshi Nakamura, Kyoto (JP); Toshihiro Hirasawa, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 14/847,059

(22) Filed: Sep. 8, 2015

(30) Foreign Application Priority Data

Mar. 13, 2015 (JP) ................... 2015-051329

(51) Int. Cl.
*G11B 33/14* (2006.01)
*G11B 33/02* (2006.01)
*G11B 19/20* (2006.01)

(52) U.S. Cl.
CPC .......... *G11B 33/027* (2013.01); *G11B 19/2009* (2013.01); *G11B 33/148* (2013.01)

(58) Field of Classification Search
CPC ............. G11B 25/043; G11B 19/2009; G11B 33/1466; G11B 33/1446; G11B 33/1486; G11B 33/022; G11B 33/121; G11B 33/14; G11B 33/148; G11B 33/027
See application file for complete search history.

(56) References Cited

U.S. PATENT DOCUMENTS

| 7,218,473 | B2 * | 5/2007 | Bernett | G11B 33/1466 |
| | | | | 29/603.03 |
| 7,773,338 | B2 * | 8/2010 | Hayakawa | G11B 33/02 |
| | | | | 360/97.22 |
| 7,876,528 | B2 * | 1/2011 | Uefune | G11B 25/043 |
| | | | | 360/97.22 |
| 7,957,092 | B2 * | 6/2011 | Ichikawa | G11B 25/043 |
| | | | | 360/99.2 |
| 8,094,408 | B2 * | 1/2012 | Uefune | G11B 25/043 |
| | | | | 360/99.21 |
| 8,196,284 | B2 * | 6/2012 | Uefune | G11B 25/043 |
| | | | | 29/603.03 |
| 2006/0023339 | A1 | 2/2006 | Fukuyama et al. | |
| 2013/0033780 | A1 | 2/2013 | Jeon | |
| 2013/0114160 | A1 | 5/2013 | Choi | |
| 2013/0271868 | A1 | 10/2013 | Choi | |
| 2014/0218822 | A1 | 8/2014 | Cheong et al. | |
| 2014/0368948 | A1* | 12/2014 | Okutani | G11B 25/043 |
| | | | | 360/97.12 |

FOREIGN PATENT DOCUMENTS

JP 2006-040423 A 2/2006

* cited by examiner

*Primary Examiner* — Will J Klimowicz
(74) *Attorney, Agent, or Firm* — Keating & Bennett, LLP

(57) ABSTRACT

A spindle motor includes a base portion molded by casting. The base portion includes a plate portion extends radially with respect to a central axis, and a wall portion arranged to extend in an axial direction from a radially outer edge of the plate portion. The wall portion includes a hole portion in which an attaching member to attach a cover member to the spindle motor is arranged, and is arranged to support at least a portion of the cover member. An inside surface of the base portion includes a metal surface subjected to a cutting process. The base portion includes a recessed portion arranged between the metal surface and the hole portion. The recessed portion is recessed either upward or downward in the axial direction, overlaps with at least one of the metal surface and the hole portion when viewed in a horizontal direction perpendicular to the central axis.

16 Claims, 4 Drawing Sheets

SPINDLE MOTOR AND DISK DRIVE APPARATUS

BACKGROUND OF THE INVENTION

1. Field of the Invention

The present invention relates to a spindle motor and a disk drive apparatus.

2. Description of the Related Art

In accordance with increased storage density of disks, there has been a demand for disk drive apparatuses, such as, for example, hard disk drives, to control rotation of the disks, movement of heads, and so on with high precision. In a known hard disk drive (HDD) disclosed in JP-A 2006-40423, a gas arranged in an interior of the HDD is a low-density gas, such as, for example, a helium gas or a hydrogen gas, and the HDD is thus arranged to achieve a reduction in resistance of the gas against a disk, a head, and so on during rotation of a spindle motor. The reduction in the resistance of the gas against the disk, the head, and so on contributes to reducing vibration of the disk, the head, and so on, enabling highly precise data recording. Such a disk drive apparatus includes a base defined by machining a plate material, such as, for example, an SPCC plate, or a casting of an aluminum-based alloy.

Bases of some spindle motors (hereinafter referred to simply as "motors") installed in HDDs are defined by portions of housings of the HDDs. In the case where the interior of the HDD is filled with a gas such as a helium gas or the like as described in JP-A 2006-40423, the helium gas, for example, which has extremely small molecules, tends to easily leak out of the interior of the HDD to an outside of the HDD. In the case of such a spindle motor, a base of the spindle motor is produced by casting, and accordingly, a blowhole may be defined in the base. Such a blowhole is, for example, exposed on a surface of the base, which has been subjected to a cutting process. Thus, the blowhole may join a space inside the base to a space outside the base through the surface of the base which has been subjected to the cutting process. If this happens, a gas, such as a helium gas or the like, which is arranged in the space inside the base may leak out to the space outside the base.

SUMMARY OF THE INVENTION

A spindle motor according to a preferred embodiment of the present invention is a spindle motor for use in a disk drive apparatus including a cover member to be attached to the spindle motor. The spindle motor includes a rotor portion arranged to rotate about a central axis extending in a vertical direction, and including a rotor magnet; a bearing portion arranged to support the rotor portion such that the rotor portion is rotatable about the central axis; a stator portion arranged opposite to the rotor magnet; and a base portion molded by casting, and arranged to contain the rotor portion, the bearing portion, and the stator portion. The base portion includes a plate portion arranged to extend radially with respect to the central axis, and a wall portion arranged to extend in an axial direction from a radially outer edge of the plate portion. The wall portion includes a hole portion in which an attaching member to attach the cover member to the spindle motor is arranged, and is arranged to support at least a portion of the cover member. An inside surface of the base portion includes a metal surface subjected to a cutting process. The base portion includes a recessed portion arranged between the metal surface and the hole portion. The recessed portion is recessed either upward or downward in the axial direction, and is arranged to overlap with at least one of the metal surface and the hole portion when viewed in a horizontal direction perpendicular to the central axis.

According to preferred embodiments of the present invention, a spindle motor and a disk drive apparatus which have structures which are able to prevent a leakage of an internal gas are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
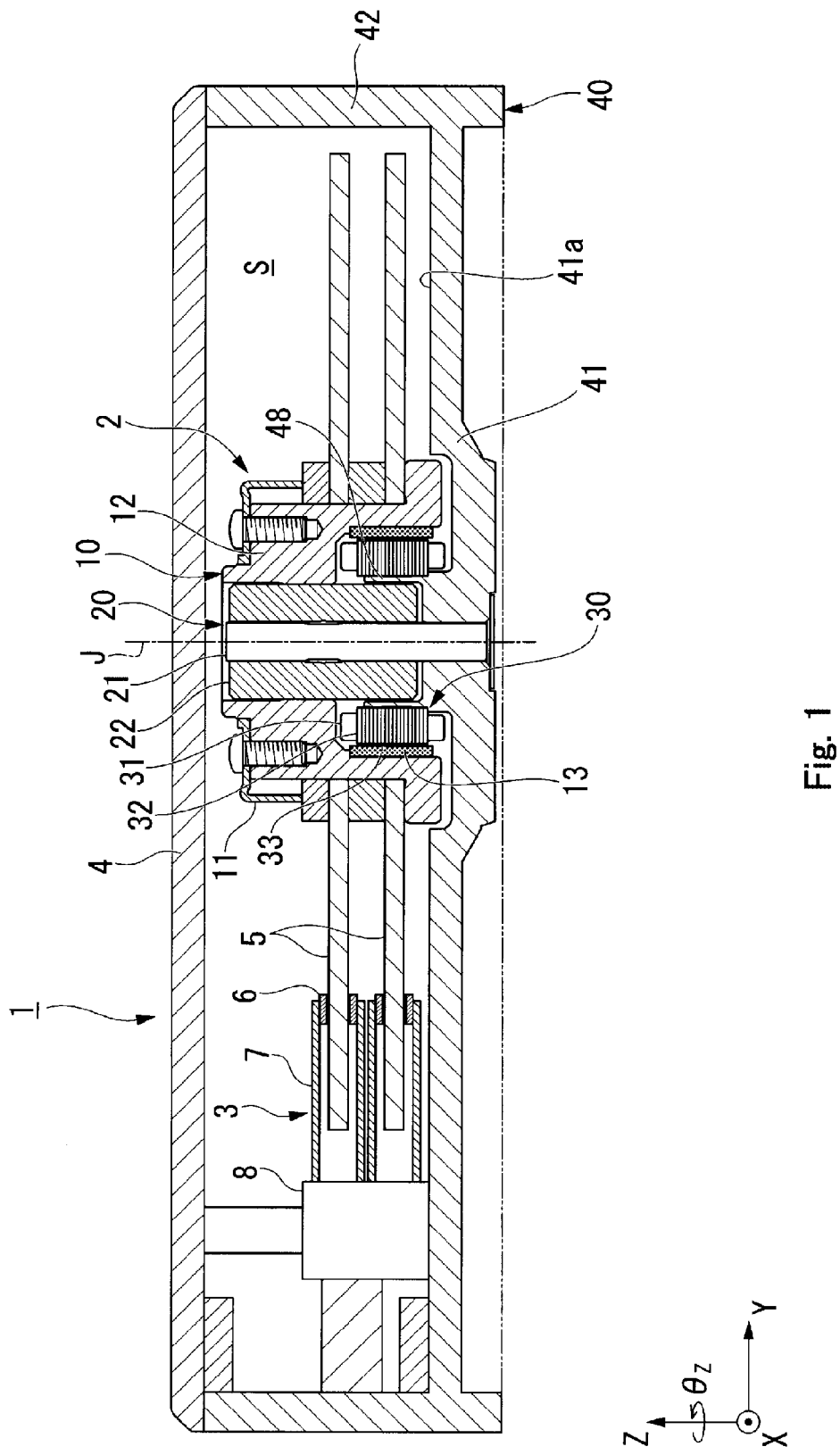
FIG. 1 is a cross-sectional view illustrating a disk drive apparatus according to a first preferred embodiment of the present invention.

Hereinafter, motors according to preferred embodiments of the present invention will be described with reference to the accompanying drawings. Note that the scope of the present invention is not limited to the preferred embodiments described below, but includes any modification thereof within the scope of the technical idea of the present invention. Also note that scales, numbers, and so on of members or portions illustrated in the following drawings may differ from those of actual members or portions, for the sake of easier understanding of the members or portions.

In the accompanying drawings, an xyz coordinate system is shown appropriately as a three-dimensional orthogonal coordinate system. In the xyz coordinate system, a z-axis direction is assumed to be a direction parallel to an axial direction of a central axis J shown in FIG. 1. A y-axis direction is assumed to be a direction perpendicular to the z-axis direction, and is assumed to be a horizontal direction in FIG. 1. An x-axis direction is assumed to be a direction perpendicular to both the z-axis direction and the y-axis direction. In addition, a circumferential direction about the central axis J will be referred to as a $\theta_Z$ direction.

In addition, it is assumed in the following description that a direction in which the central axis J extends (that is, the z-axis direction) is a vertical direction. A positive side (i.e., a +z side) in the z-axis direction will sometimes be referred to as an upper side (or an axially upper side), while a negative side (i.e., a −z side) in the z-axis direction will sometimes be referred to as a lower side (or an axially lower side). It should be noted, however, that the above definitions of the vertical direction and the upper and lower sides are made simply for the sake of convenience in description, and are not meant to indicate relative positions or directions of different members or portions when those members or portions are actually installed in a device. In addition, unless otherwise specified, the direction parallel to the central axis J (i.e., the z-axis direction) will sometimes be simply referred to by the term "axial direction", "axial", or "axially", radial directions centered on the central axis J will sometimes be simply referred to by the term "radial direction", "radial", or "radially", and the circumferential direction about the central axis J (that is, the $\theta_Z$ direction) will sometimes be simply referred to by the term "circumferential direction", "circumferential", or "circumferentially".

In addition, it is assumed herein that the wording "to extend in the axial direction", "to extend axially", or the like as used herein includes not only to extend exactly in the axial direction (i.e., the z-axis direction) but also to extend in a direction at an angle of less than 45 degrees to the axial direction. It is also assumed herein that the wording "to extend in a radial direction", "to extend radially", or the like as used herein includes not only to extend exactly in a radial direction or exactly radially, that is, exactly in a direction or directions perpendicular to the axial direction (i.e., the z-axis direction), but also to extend in a direction or directions at an angle of less than 45 degrees to the radial direction(s).

First Preferred Embodiment

Figure 2:
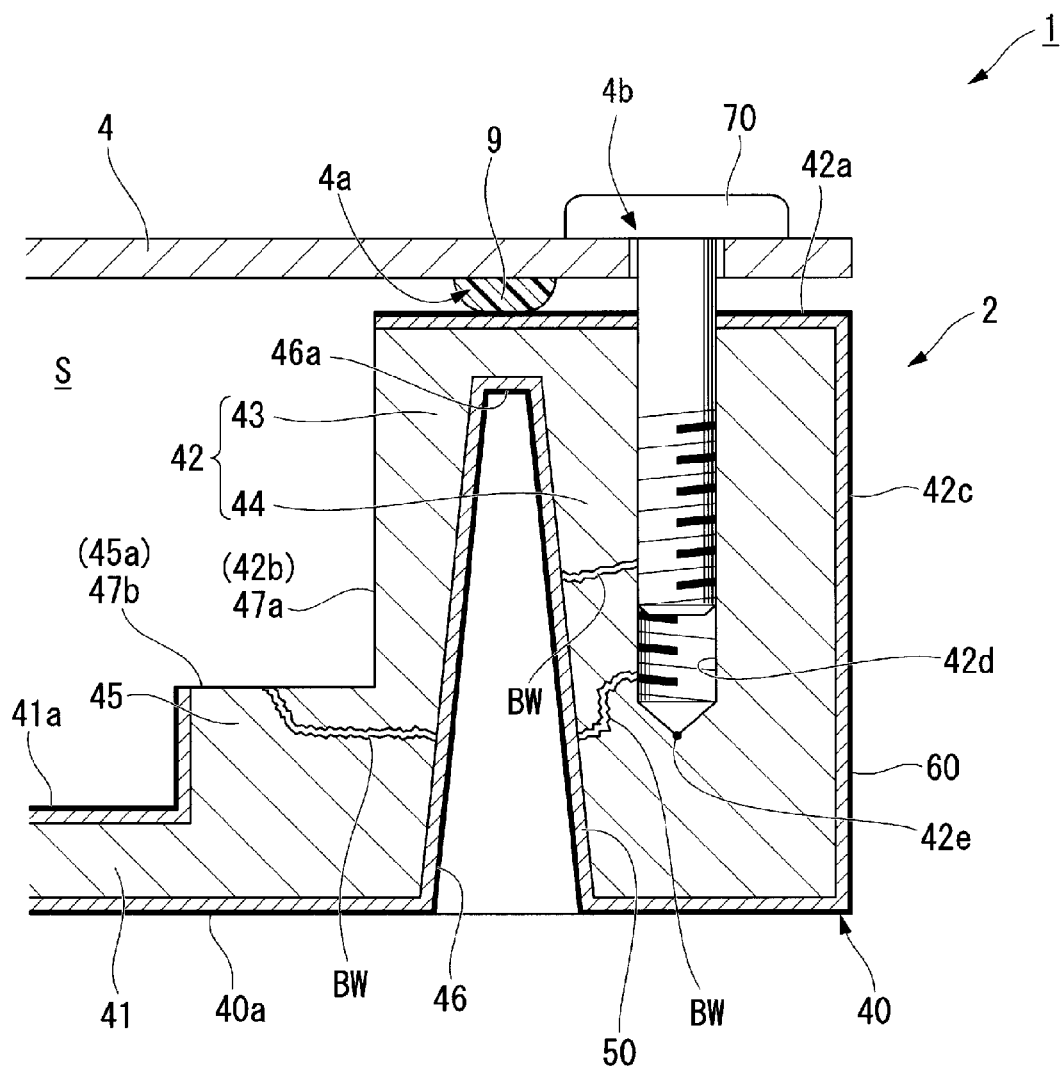
FIG. 2 is a cross-sectional view illustrating a portion of the disk drive apparatus according to the first preferred embodiment of the present invention.

FIG. 1 is a cross-sectional view of a disk drive apparatus 1 according to a first preferred embodiment of the present invention. FIG. 2 is a cross-sectional view of a portion of the disk drive apparatus 1.

The disk drive apparatus 1 is a hard disk drive. Referring to FIG. 1, the disk drive apparatus 1 includes a spindle motor 2, a plurality of disks 5, an access portion 3, and a cover member 4. That is, the spindle motor 2 according to the present preferred embodiment is used in the disk drive apparatus 1.

The spindle motor 2 is arranged to rotate the plurality of disks 5 about the central axis J (i.e., in $\pm\theta_Z$ directions). The spindle motor 2 includes a base portion 40, a rotor portion 10, a bearing portion 20, and a stator portion 30.

The base portion 40 is in the shape of a box with an opening on an upper side thereof. The base portion 40 is arranged to contain the disks 5, the access portion 3, the rotor portion 10, the bearing portion 20, and the stator portion 30. The base portion 40 includes a plate portion 41, a wall portion 42, and a stator support portion 48. The plate portion 41 is arranged to extend radially with respect to the central axis J.

The wall portion 42 is arranged to extend in the axial direction from a radially outer edge of the plate portion 41. The wall portion 42 includes screw holes 42d, each of which is a hole portion. That is, an inside of each hole portion according to the present preferred embodiment includes a screw thread. Each screw hole 42d according to the present preferred embodiment is recessed downward from a wall portion upper surface 42a, which is an upper surface of the wall portion 42.

The stator support portion 48 is arranged to project upward from a plate portion upper surface 41a, which is an upper surface of the plate portion 41. The base portion 40 will be described in more detail below.

The rotor portion 10 is arranged to rotate about the central axis J (i.e., in the $\pm\theta_Z$ directions) extending in the vertical direction. The rotor portion 10 includes a clamp member 11, a rotor hub 12, and a rotor magnet 13. The clamp member 11 is arranged to support the plurality of disks 5.

The bearing portion 20 is arranged to support the rotor portion 10 such that the rotor portion 10 is rotatable about the central axis J (i.e., in the $\pm\theta_Z$ directions). The bearing portion 20 includes a shaft 21 and a sleeve 22. The shaft 21 is fixed to the base portion 40. The shaft 21 and the sleeve 22 are arranged opposite to each other with a gap intervening therebetween. A fluid, such as, for example, a lubricating oil or a gas, is arranged in the gap between the shaft 21 and the sleeve 22.

The stator portion 30 includes a stator core 32 and a plurality of coils 31. The stator core 32 is supported by the stator support portion 48. The stator core 32 is, for example, a laminated structure defined by laminated magnetic bodies. The stator core 32 includes a plurality of salient poles 33 arranged to project radially outward. A separate one of the coils 31 is wound around each of the plurality of salient poles 33. Each coil 31 is arranged radially opposite to the rotor magnet 13 with a gap intervening therebetween. That is, the stator portion 30 is arranged opposite to the rotor magnet 13.

The cover member 4 is attached to the spindle motor 2. More specifically, the cover member 4 is attached to the base portion 40. The cover member 4 is arranged on an upper end of the wall portion 42 to close an upper opening of the spindle motor 2. The cover member 4 is, for example, in the shape of a plate.

Referring to FIG. 2, according to the present preferred embodiment, the cover member 4 is fixed to the base portion 40 through screws 70, each of which is an attaching member. That is, the disk drive apparatus 1 includes the attaching members, each of which is used to attach the cover member 4 to the base portion 40. Each screw 70 is screwed into a corresponding one of the screw holes 42d through a cover member through hole 4b arranged to pass through the cover member 4 in the axial direction. That is, the screw 70 is arranged in each screw hole 42d. The cover member 4 is thus securely fixed to the base portion 40.

Note that an attaching member arranged to attach the cover member to the base portion may be either a member arranged to fix the cover member to the base portion or a member arranged to position the cover member with respect to the base portion.

The cover member 4 includes a sealing portion 4a. The sealing portion 4a is a portion of a lower surface of the cover member 4. The sealing portion 4a is arranged to be in contact with the wall portion upper surface 42a. That is, the wall portion 42 is arranged to support at least a portion of the cover member 4.

According to the present preferred embodiment, the sealing portion 4a is arranged to be, for example, in indirect contact with the wall portion upper surface 42a through a sealing member 9. The sealing member 9 is not limited to any particular member, and is, for example, a gasket made of a resin material or the like. The sealing portion 4a is arranged radially inward of each screw hole 42d.

Referring to FIG. 1, the disk drive apparatus 1 includes a housing space S enclosed by the base portion 40 and the cover member 4. The housing space S is filled with, for example, a helium gas. Note that the housing space S may alternatively be filled with a hydrogen gas, air, or the like. According to the present preferred embodiment, the base portion and the cover member 4 are arranged to together define a housing of the disk drive apparatus 1.

Each of the disks 5 is an information storage medium. Each disk 5 is supported by the spindle motor 2. More specifically, each disk 5 is supported by the rotor portion 10 of the spindle motor 2. Each disk 5 is arranged to rotate about the central axis J (i.e., in the $\pm\theta_Z$ directions) together with the rotor portion 10.

The access portion 3 is arranged to perform at least one of reading and writing of information from or to the disks 5. The access portion 3 includes heads 6, arms 7, and a head actuator mechanism 8. Each of the heads 6 is arranged in close proximity to a surface of one of the disks 5 to magnetically perform at least one of the reading and the writing of information. Each head 6 is supported by an associated one of the arms 7. Each arm 7 is supported by the head actuator mechanism 8.

Next, the base portion 40 will now be described in detail below. The base portion 40 is molded by casting. The base portion 40 is, for example, a die-cast member made of an aluminum alloy. Referring to FIG. 2, the base portion 40 according to the present preferred embodiment includes a chill layer 50 at a surface thereof. The chill layer 50 is a layer which has a denser internal structure than that of a remaining portion of the base portion 40 and which is defined as a result of rapid cooling of a portion of a material of the base portion 41 which adjoins a mold when the base portion 41 is molded by casting. The chill layer 50 of the base portion 40 according to the present preferred embodiment is arranged to extend over the entire surface of the base portion 41, excluding metal-exposed surfaces including metal surfaces 47a and 47b described below.

The base portion 40 includes an installation portion 45. The installation portion 45 is arranged to project upward from the plate portion upper surface 41a. The installation portion 45 is joined to the wall portion 42. A ramp mechanism, for example, is attached to an installation portion upper surface 45a, which is an upper surface of the installation portion 45. The ramp mechanism is a mechanism to hold each head 6 when each disk 5 is stopped.

According to the present preferred embodiment, an inside surface of the base portion 40 includes the metal surfaces 47a and 47b, each of which has been subjected to a cutting process. In the preferred embodiment illustrated in FIG. 2, the metal surface 47a defines at least a portion of a wall portion inside surface 42b, which is an inside surface of the wall portion 42. In the preferred embodiment illustrated in FIG. 2, the metal surface 47b defines at least a portion of the installation portion upper surface 45a. The metal surface 47a is arranged to be, for example, parallel to the central axis J. The metal surface 47b is arranged to be, for example, perpendicular to the central axis J. The metal surface 47a and the metal surface 47b are, for example, joined to each other. According to the present preferred embodiment, both the metal surfaces 47a and 47b are arranged, for example, in the vicinity of the wall portion 42. According to the present preferred embodiment, each screw hole 42d and each of the metal surfaces 47a and 47b are arranged to overlap with each other when viewed in a horizontal direction (i.e., the x-axis direction) perpendicular to the central axis J.

Note that the term "metal surface" as used herein refers to, for example, a portion of the surface of the cast base portion 40 at which a metallic portion beneath the chill layer 50 is exposed to the housing space S. Metal surfaces according to preferred embodiments of the present invention may be flat surfaces like the metal surfaces 47a and 47b as illustrated in FIG. 2, curved surfaces, or inner surfaces of screw holes.

Also note that the inside surface of the base portion as described herein includes a portion of the surface of the base portion which adjoins the housing space S. Also note that the inside surface of the wall portion as described herein includes a portion of the surface of the wall portion which adjoins the housing space S.

Figure 3:
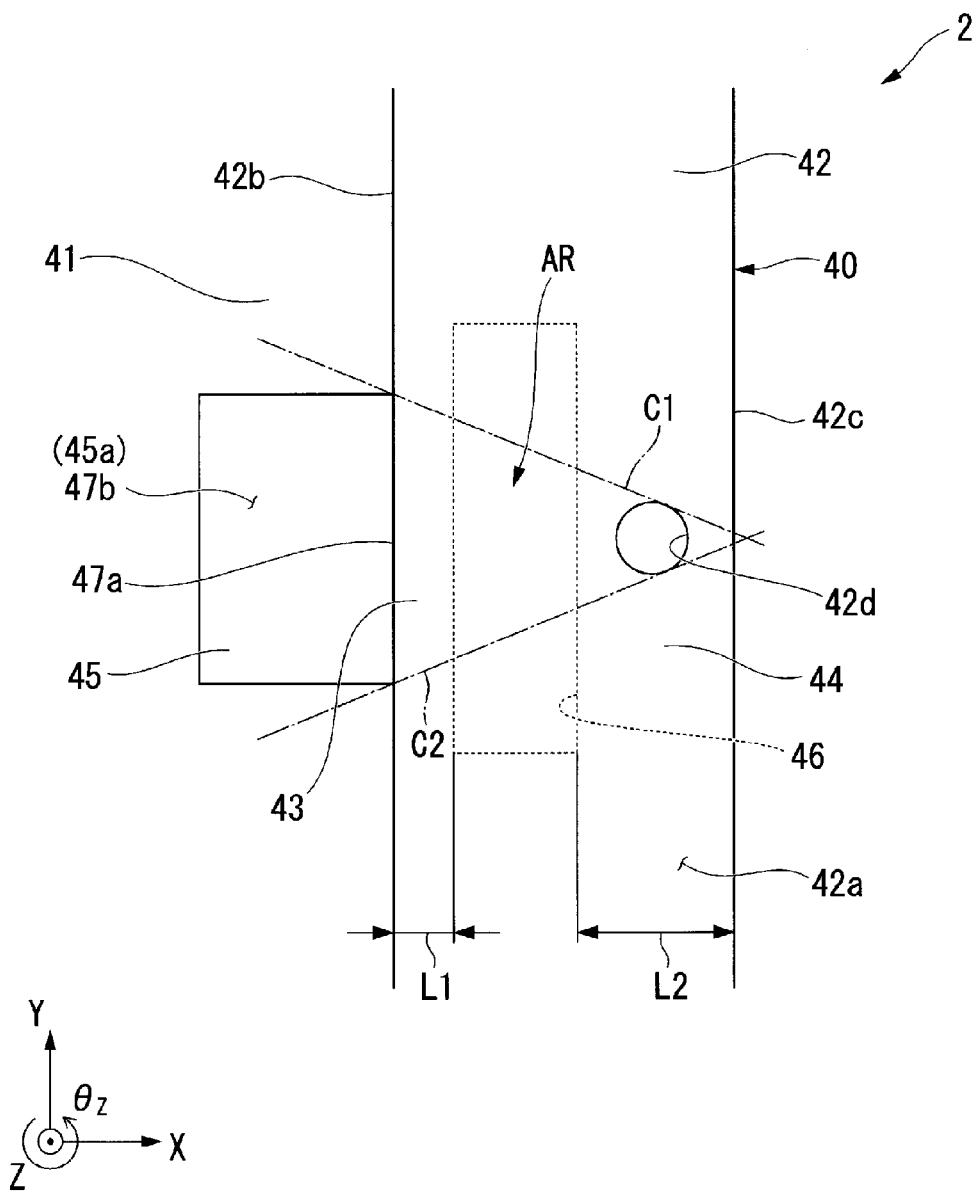
FIG. 3 is a plan view illustrating a portion of a spindle motor according to the first preferred embodiment of the present invention.

FIG. 3 is a plan view illustrating a portion of the spindle motor 2. Referring to FIGS. 2 and 3, the base portion 40 includes recessed portions 46. Each recessed portion 46 is arranged between the metal surfaces 47a and 47b and the screw hole 42d. Referring to FIG. 2, according to the present preferred embodiment, the recessed portion 46 is recessed upward from a base portion lower surface 40a, which is a lower surface of the base portion 40.

Note that the wording "the recessed portion is arranged between the metal surface(s) and the screw hole" as used herein comprehends a situation in which the recessed portion is arranged between the metal surface(s) and the screw hole in a direction along which the metal surface(s) and the screw hole are arranged in a plan view. The direction along which the metal surface(s) and the screw hole are arranged in the plan view is, for example, a direction parallel to the shortest line segment which joins the metal surfaces 47a and 47b and the screw hole 42d in the plan view. In FIGS. 2 and 3, the direction along which the metal surfaces 47a and 47b and the screw hole 42d are arranged is the x-axis direction.

Note that, in the following description, the direction (i.e., the x-axis direction) along which the metal surfaces 47a and 47b and the screw hole 42d are arranged in the plan view will sometimes be referred to simply as an "arrangement direction". Also note that a direction (i.e., the y-axis direction) perpendicular to the arrangement direction in the plan view will sometimes be referred to simply as a "perpendicular direction".

Referring to FIG. 2, the recessed portion 46 is arranged to overlap with at least one of the metal surfaces 47a and 47b and the screw hole 42d when viewed in the horizontal direction perpendicular to the central axis J, i.e., the arrangement direction (i.e., the x-axis direction).

A blowhole (i.e., a gap) BW may be defined in the base portion 40 molded by casting. The blowhole BW may be exposed to the housing space S by, for example, a cutting process. That is, each of the metal surfaces 47a and 47b, each of which has been subjected to the cutting process, may include a blowhole BW which opens into a space inside the base portion 40, i.e., into the housing space S. In this case, if the screw hole 42d is included in the base portion 40, for example, the blowhole BW may join the housing space S and the screw hole 42d to each other. If the blowhole BW joins the housing space S and the screw hole 42d to each other, the helium gas arranged in the housing space S may pass through the blowhole BW and the screw hole 42d to leak out of the disk drive apparatus 1.

However, according to the present preferred embodiment, the base portion 40 includes the recessed portion 46 arranged between the metal surfaces 47a and 47b and the screw hole 42d, and the blowhole BW tends to be easily blocked by the recessed portion 46. Thus, the blowhole BW can be prevented from joining the housing space S and the screw hole 42d to each other. Therefore, it can be said that the spindle motor 2 and the disk drive apparatus 1 according to the present preferred embodiment have structures which are able to prevent a leakage of the internal gas.

In addition, portions of the base portion 40 at which the screw holes 42d are defined to attach the cover member 4 to the base portion 40 tend to have increased thicknesses. Blowholes BW tend to be defined more easily in portions of a cast which have greater thicknesses. Accordingly, blowholes BW tend to be defined more easily in the portions of the base portion 40 at which the screw holes 42d are defined than in other portions of the base portion 40. Therefore, the helium gas in the housing space S tends to leak more likely through the screw hole 42d than through another portion.

However, according to the present preferred embodiment, the helium gas can be prevented from leaking out through any screw hole 42d as described above, and therefore, a leakage of the helium gas out of the housing space S can be particularly effectively prevented.

Moreover, in the case where the screw hole 42d and the metal surfaces 47a and 47b are arranged to overlap with each other when viewed in the horizontal direction (i.e., the x-axis direction) as in the present preferred embodiment, a distance between the screw hole 42d and the metal surfaces 47a and 47b is often small. Therefore, a blowhole BW defined in the base portion 40 between the screw hole 42d and the metal surfaces 47a and 47b often joins the screw hole 42d and the housing space S to each other through the metal surfaces 47a and 47b.

However, according to the present preferred embodiment, the recessed portion 46 contributes to preventing the screw hole 42d and the housing space S from being joined to each other. Therefore, an effect of prevention of a leakage of the helium gas according to the present preferred embodiment is particularly great when the screw hole 42d and the metal surfaces 47a and 47b are arranged to overlap with each other when viewed in the horizontal direction (i.e., the x-axis direction) as in the present preferred embodiment.

According to the present preferred embodiment, the recessed portion 46 is arranged to overlap with both the metal surfaces 47a and 47b and the screw hole 42d when viewed in the horizontal direction perpendicular to the central axis J, i.e., the arrangement direction (i.e., the x-axis direction). This enables the recessed portion 46 to more effectively block any blowhole BW defined between the metal surfaces 47a and 47b and the screw hole 42d. This contributes to more effectively preventing a leakage of the helium gas out of the housing space S.

According to the present preferred embodiment, each recessed portion 46 is defined in the wall portion 42. If the recessed portion 46 is defined in a portion of the base portion which has a relatively small axial dimension, for example, the recessed portion 46 will further reduce the axial dimension of the portion of the base portion 40, which may result in reduced rigidity of the base portion 40. The wall portion 42 is a portion of the base portion 40 which has a relatively large axial dimension. Therefore, when the recessed portion 46 is defined in the wall portion 42, the base portion 40 can easily maintain sufficient rigidity.

Note that the wording "the recessed portion is defined in the wall portion" as used herein comprehends, for example, a situation in which at least a portion of the recessed portion is defined in the wall portion.

According to the present preferred embodiment, a recessed portion upper end 46a, which is an upper end portion of the recessed portion 46, is arranged in the wall portion 42. The recessed portion upper end 46a is arranged at a level higher than that of a screw hole lower end 42e, which is a lower end portion of the screw hole 42d. Accordingly, the axial dimension of the recessed portion 46 can be easily increased. Thus, any blowhole BW defined between the metal surfaces 47a and 47b and the screw hole 42d can be easily blocked by the recessed portion 46.

In addition, the recessed portion upper end 46a can be arranged close to the wall portion upper surface 42a. Accordingly, a portion of the wall portion 42 which is above the recessed portion 46 can be arranged to have a small axial dimension. This contributes to reducing the likelihood that a blowhole BW will be defined in the portion of the wall portion 42 which is above the recessed portion 46. Thus, according to the present preferred embodiment, the likelihood that a leakage of the helium gas will occur can be further reduced.

A portion of the wall portion 42 is divided by the recessed portion 46 into an inner wall portion 43 and an outer wall portion 44. That is, the wall portion 42 includes the inner wall portion 43 and the outer wall portion 44. Referring to FIG. 3, the inner wall portion 43 is arranged between the wall portion inside surface 42b and the recessed portion 46 in a plan view. The outer wall portion 44 is arranged between the recessed portion 46 and a wall portion outside surface 42c, which is an outside surface of the wall portion, in the plan view. The screw hole 42d is defined in the outer wall portion 44.

The inner wall portion 43 is arranged to have a thickness L1 smaller than a thickness L2 of the outer wall portion 44. Therefore, it is easy to make the thickness L1 of the inner wall portion 43 relatively small. Thus, the likelihood that a blowhole BW will be defined in the inner wall portion 43 can be reduced. This contributes to preventing an occurrence of a blowhole BW which extends from one of the metal surfaces 47a and 47b to the screw hole 42d through the portion of the wall portion 42 which is above the recessed portion 46, for example. This in turn contributes to more effectively preventing a leakage of the helium gas. The thickness L1 is a dimension of the inner wall portion 43 as measured in the arrangement direction (i.e., the x-axis direction). The thickness L2 is a dimension of the outer wall portion 44 as measured in the arrangement direction.

Note that it is assumed herein that the outside surface of the wall portion includes a surface of the wall portion which faces away from the housing space S.

Referring to FIG. 2, according to the present preferred embodiment, the recessed portion 46 is arranged under a portion of the wall portion upper surface 42a which is in contact with the sealing member 9. That is, the sealing portion 4a is arranged to axially overlap with the recessed portion 46. If the wall portion upper surface 42a were a metal-exposed surface subjected to a cutting process, and the sealing portion 4a were arranged radially inward of the recessed portion 46, for example, the helium gas might leak out through a blowhole BW extending from one of the metal surfaces 47a and 47b to a portion of the wall portion upper surface 42a which is radially outward of the sealing portion 4a.

The portion of the base portion 40 which is above the recessed portion 46 tends to have a relatively small thickness, and therefore, a blowhole BW does not easily occur in this portion. Therefore, when the sealing portion 4a is arranged to axially overlap with the recessed portion 46, the sealing portion 4a can be arranged at a position at which a blowhole BW does not easily occur. Thus, according to the present preferred embodiment, an occurrence of a blowhole BW which extends from one of the metal surfaces 47a and 47b to the portion of the wall portion upper surface 42a which is radially outward of the sealing portion 4a through the portion of the base portion 40 which is above the recessed portion 46 can be prevented.

In addition, because the sealing portion 4a and the recessed portion 46 are arranged to axially overlap with each other, a dimension of a portion of the wall portion 42 which is located on a side (i.e., a −x side) of the screw hole 42d closer to the housing space S as measured in the arrangement direction (i.e., the x-axis direction) can be more easily reduced than in the case where the sealing portion 4a and the recessed portion 46 do not axially overlap with each other. This contributes to preventing a blowhole BW from being defined in a portion of the wall portion 42 between the screw hole 42d and the metal surfaces 47a and 47b.

Referring to FIG. 3, in the present preferred embodiment, a straight line which is tangent to an edge portion of the metal surfaces 47a and 47b on one side (i.e., a +y side) in the perpendicular direction and to an edge portion of the screw hole 42d on the one side (i.e., the +y side) in the perpendicular direction in a plan view is defined as a first straight line C1. In the present preferred embodiment, a straight line which is tangent to the edge portion of the metal surfaces 47a and 47b on an opposite side (i.e., a −y side) in the perpendicular direction and to the edge portion of the screw hole 42d on the opposite side (i.e., the −y side) in the perpendicular direction in the plan view is defined as a second straight line C2.

According to the present preferred embodiment, an area AR surrounded by the edge portion of the metal surfaces 47a and 47b, the edge portion of the screw hole 42d, the first straight line C1, and the second straight line C2 is arranged to overlap with at least a portion of the recessed portion 46 in the plan view. The area AR, over which straight lines can join the metal surfaces 47a and 47b and the screw hole 42d, is an area through which the helium gas may leak out with a relatively high probability. Therefore, it is preferable that the area AR and at least a portion of the recessed portion 46 be arranged to overlap with each other. This enables the recessed portion 46 to more effectively block any blowhole BW defined between the metal surfaces 47a and 47b and the screw hole 42d. Thus, the likelihood that a leakage of the helium gas will occur can be further reduced.

According to the present preferred embodiment, each of the first straight line C1 and the second straight line C2 is arranged to overlap with the recessed portion 46 in the plan view. Thus, an entire extent of the area AR in the perpendicular direction (i.e., the y-axis direction) is relatively easily covered by the recessed portion 46 in the plan view. This enables the recessed portion 46 to more effectively block any blowhole BW defined between the metal surfaces 47a and 47b and the screw hole 42d. Thus, the likelihood that a leakage of the helium gas will occur can be further reduced.

Note that no particular limitation is imposed on the shape of the recessed portion 46. According to the present preferred embodiment, the recessed portion 46 is arranged to be in the shape of, for example, a rectangle having long sides extending in the perpendicular direction (i.e., the y-axis direction) in the plan view. The recessed portion 46 is arranged to extend from the one side (i.e., the +y side) of the area AR to the opposite side (i.e., the −y side) of the area AR in the perpendicular direction. Referring to FIG. 2, the recessed portion 46 is arranged to be in the shape of, for example, a trapezoid whose dimension as measured in the arrangement direction (i.e., the x-axis direction) decreases with increasing height when viewed in the perpendicular direction (i.e., the y-axis direction).

According to the present preferred embodiment, the recessed portion 46 is, for example, defined simultaneously when the base portion 40 is molded by casting. Accordingly, according to the present preferred embodiment, a surface of the recessed portion 46 includes a portion of the chill layer 50. Because the chill layer 50 has a relatively dense internal structure, no blowhole BW is defined in the chill layer 50. Accordingly, any blowhole BW defined in the wall portion 42 is more securely blocked by the portion of the chill layer 50 included in the recessed portion 46. Therefore, according to the present preferred embodiment, the likelihood that a leakage of the helium gas will occur can be further reduced.

Although not shown in the figures, the wall portion 42 includes, for example, as many recessed portions 46 as the number of screw holes 42d and the number of screws 70 needed to attach the cover member 4 to the base portion 40. The number of recessed portions 46 included in the wall portion 42 is, for example, six. The number of screw holes 42d included in the wall portion 42 is, for example, six. The number of screws 70 included in the disk drive apparatus 1 is, for example, six.

The base portion 40 according to the present preferred embodiment includes a coating film 60. In the preferred embodiment illustrated in FIG. 2, the coating film 60 is arranged to cover the entire surface of the base portion 40, excluding the metal surfaces 47a and 47b and the screw holes 42d. That is, the surface of each recessed portion 46 includes a portion of the coating film 60. Accordingly, even if a blowhole BW has an opening in the surface of any recessed portion 46, for example, the helium gas is blocked by the coating film 60, and is prevented from leaking out. Moreover, in the case where the surface of each recessed portion 46 includes a portion of the chill layer 50 as in the present preferred embodiment, the likelihood that a leakage of the helium gas will occur is further reduced by the chill layer 50 and the coating film 60. The coating film 60 is, for example, a resin film, such as an epoxy resin film, or a metal film, such as nickel plating.

Note that the present preferred embodiment can be modified in any of the following manners.

In a modification of the present preferred embodiment, the recessed portion 46 may be arranged to overlap with only one of the metal surfaces 47a and 47b and the screw hole 42d when viewed in the horizontal direction (i.e., the x-axis direction) perpendicular to the central axis J.

In a modification of the present preferred embodiment, the recessed portion 46 may be recessed either upward or downward in the axial direction. That is, in a modification of the present preferred embodiment, the recessed portion 46 may be recessed downward. In this case, the recessed portion 46 is recessed downward, for example, from the plate portion upper surface 41a.

Also, in a modification of the present preferred embodiment, the number of recessed portions 46 may be smaller than the number of screws 70 needed to attach the cover member 4 to the base portion 40. In this case, at least one of the recessed portions 46 may be arranged to extend between more than one screw hole 42d and more than one pair of metal surfaces 47a and 47b, for example, and no recessed portion 46 may be arranged between at least one of the screw holes 42d and at least one pair of metal surfaces 47a and 47b, for example.

Also, in a modification of the present preferred embodiment, each screw hole 42d may be defined at any position in the wall portion 42. In a modification of the present preferred embodiment, the screw hole 42d may be defined at the wall portion outside surface 42c or at the lower surface of the wall portion 42, for example. Also, in a modification of the present preferred embodiment, each screw hole 42d may be arranged to extend in any direction, and the screw hole 42d may be arranged to extend in a direction at an angle to the axial direction or in the horizontal direction, for example.

Also, in a modification of the present preferred embodiment, the screw hole 42d and the metal surfaces 47a and 47b may not be arranged to overlap with each other when viewed in the horizontal direction (i.e., the x-axis direction) centered on the central axis J.

Also, in a modification of the present preferred embodiment, the wall portion 42 may include a hole portion including no screw thread in place of each screw hole 42d. In this case, the hole portion including no screw thread is, for example, a hole in which a pin to position the cover member 4 is arranged. The pin is an attaching member used to attach the cover member 4 to the base portion 40. This arrangement enables the cover member 4 to be positioned with respect to the base portion 40 through the pin, and thus makes it possible to fix the cover member 4 to the base portion 40 with high precision. This contributes to improved airtightness of the housing space S. Note that, in a modification of the present preferred embodiment, the wall portion 42 may include both the screw hole(s) 42d and the hole portion(s) including no screw hole.

Also, in a modification of the present preferred embodiment, the base portion 40 may not include the chill layer 50. Also, in a modification of the present preferred embodiment, the base portion 40 may not include the coating film 60.

Also, in a modification of the present preferred embodiment, the inside surface of the base portion 40 may include only one of the metal surfaces 47a and 47b. Also, in a modification of the present preferred embodiment, the plate portion upper surface 41a may include a metal surface. Also, in a modification of the present preferred embodiment, the inside surface of the base portion 40 may include a metal surface at any position.

Also, in a modification of the present preferred embodiment, a resin may be arranged in the blowhole BW. This arrangement contributes to preventing the helium gas in the housing space S from entering into the blowhole BW, and to more effectively preventing a leakage of the helium gas. Note that any resin that can be arranged in the blowhole BW may be used as the resin.

Also, in a modification of the present preferred embodiment, the disk drive apparatus 1 may not include the sealing member 9. In this case, the sealing portion 4a of the cover member 4 is arranged to be in direct contact with the wall portion upper surface 42a, for example.

Second Preferred Embodiment

A second preferred embodiment of the present invention is different from the first preferred embodiment in that the recessed portion is defined in the plate portion. Note that members or portions that have their equivalents in the first preferred embodiment are denoted appropriately by the same reference numerals as those of their equivalents in the first preferred embodiment, and descriptions of such members or portions may be omitted.

Figure 4:
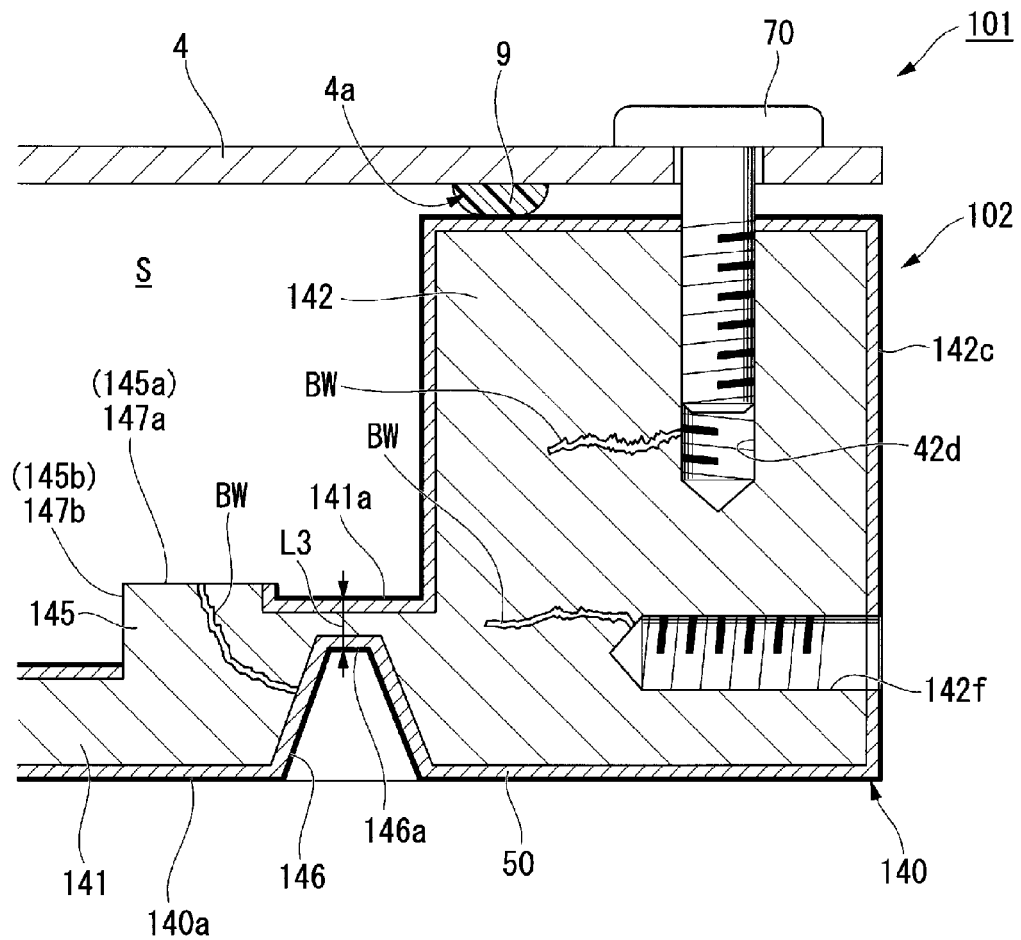
FIG. 4 is a cross-sectional view illustrating a portion of a disk drive apparatus according to a second preferred embodiment of the present invention.

FIG. 4 is a cross-sectional view illustrating a portion of a disk drive apparatus 101 according to the second preferred embodiment. The disk drive apparatus 101 includes a spindle motor 102. The spindle motor 102 includes a base portion 140. The base portion 140 includes a plate portion 141, a wall portion 142, and a recessed portion 146.

The plate portion 141 includes an installation portion 145. The installation portion 145 is arranged to project upward from a plate portion upper surface 141a, which is an upper surface of the plate portion 141. The installation portion 145 is arranged away from the wall portion 142. At least a portion of an installation portion upper surface 145a, which is an upper surface of the installation portion 145, is a metal surface 147a, which has been subjected to a cutting process. At least a portion of an installation portion side surface 145b, which is a side surface of the installation portion 145 on an opposite side (i.e., a –x side) with respect to the wall portion 142, is a metal surface 147b, which has been subjected to a cutting process. That is, an inside surface of the base portion 140 includes the metal surfaces 147a and 147b.

According to the present preferred embodiment, the recessed portion 146 is recessed upward from a base portion lower surface 140a, which is a lower surface of the base portion 140. The recessed portion 146 is arranged between the metal surfaces 147a and 147b and a screw hole 42d. The recessed portion 146 is arranged to overlap with the metal surface 147b when viewed in a horizontal direction (i.e., an x-axis direction), for example. Thus, a leakage of a helium gas can be prevented as in the first preferred embodiment.

According to the present preferred embodiment, the recessed portion 146 is defined in the plate portion 141. The plate portion 141 is arranged to have an axial dimension smaller than that of the wall portion 142. This makes it easy to allow a portion of the base portion 140 between a recessed portion upper end 146a, which is an upper end portion of the recessed portion 146, and the plate portion upper surface 141a to have a small axial dimension L3. This contributes to preventing a blowhole BW defined in the plate portion 141 from extending up to the wall portion 142, for example. Thus, according to the present preferred embodiment, the blowhole BW is prevented from joining a housing space S and the screw hole 42d to each other. As a result, a leakage of the helium gas can be more effectively prevented.

The wall portion 142 includes a device attaching screw hole 142f, which is a screw hole. The device attaching screw hole 142f is recessed from a wall portion outside surface 142c, which is an outside surface of the wall portion 142, toward the housing space S (i.e., to the –x side). An opening of the device attaching screw hole 142f in the wall portion outside surface 142c is arranged below the screw hole 42d. The device attaching screw hole 142f is arranged to extend up to a position under the screw hole 42d, for example. The device attaching screw hole 142f is arranged radially outward of a sealing portion 4a of a cover member 4.

A screw is screwed into the device attaching screw hole 142f to, for example, attach the disk drive apparatus 101 to another device, such as, for example, a personal computer. Although not shown in the figure, a plurality of device attaching screw holes 142f are included in the wall portion 142.

When the device attaching screw holes 142f are included in the wall portion 142, a blowhole BW may join the housing space S and any device attaching screw hole 142f to each other to allow the helium gas to leak out of the disk drive apparatus 101 through the device attaching screw hole 142f, for example.

However, according to the present preferred embodiment, the recessed portion 146 can prevent the blowhole BW from joining the housing space S and the device attaching screw hole 142f to each other. Thus, a leakage of the helium gas through any device attaching screw hole 142f can be prevented.

Although not shown in the figure, the plurality of device attaching screw holes 142f are included in the wall portion 142. The disk drive apparatus 101 is otherwise similar in structure to the disk drive apparatus 1 illustrated in FIGS. 1 to 3.

Note that features of the first and second preferred embodiments as described above may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor for use in a disk drive apparatus including a cover member to be attached to the spindle motor, the spindle motor comprising:
 a rotor portion arranged to rotate about a central axis extending in a vertical direction, and including a rotor magnet;
 a bearing portion arranged to support the rotor portion such that the rotor portion is rotatable about the central axis;
 a stator portion arranged opposite to the rotor magnet; and
 a base portion molded by casting, and arranged to contain the rotor portion, the bearing portion, and the stator portion; wherein
 the base portion includes a plate portion arranged to extend radially with respect to the central axis, and a wall portion arranged to extend in an axial direction from a radially outer edge of the plate portion;

the wall portion includes a hole portion in which an attaching member to attach the cover member to the spindle motor is arranged, and is arranged to support at least a portion of the cover member;

an inside surface of the base portion includes a metal surface subjected to a cutting process;

the base portion includes a recessed portion arranged between the metal surface and the hole portion; and the recessed portion is recessed either upward or downward in the axial direction, and is arranged to overlap with at least one of the metal surface and the hole portion when viewed in a horizontal direction perpendicular to the central axis.

2. The spindle motor according to claim 1, wherein the recessed portion is arranged to overlap with both the metal surface and the hole portion when viewed in the horizontal direction.

3. The spindle motor according to claim 2, wherein the hole portion and the metal surface are arranged to overlap with each other when viewed in the horizontal direction.

4. The spindle motor according to claim 1, wherein when a straight line which is tangent to an edge portion of the metal surface on one side and to an edge portion of the hole portion on the one side in a plan view is defined as a first straight line, and a straight line which is tangent to the edge portion of the metal surface on an opposite side and to the edge portion of the hole portion on the opposite side in the plan view is defined as a second straight line;

an area surrounded by the edge portion of the metal surface, the edge portion of the hole portion, the first straight line, and the second straight line is arranged to overlap with at least a portion of the recessed portion in the plan view.

5. The spindle motor according to claim 4, wherein each of the first and second straight lines is arranged to overlap with the recessed portion in the plan view.

6. The spindle motor according to claim 1, wherein a surface of the recessed portion includes a chill layer.

7. The spindle motor according to claim 6, wherein the surface of the recessed portion includes a coating film.

8. The spindle motor according to claim 1, wherein the recessed portion is defined in the wall portion.

9. The spindle motor according to claim 8, wherein the recessed portion is recessed upward from a lower surface of the base portion;

an upper end portion of the recessed portion is arranged in the wall portion;

the wall portion includes an inner wall portion arranged between an inside surface of the wall portion and the recessed portion in a plan view, and an outer wall portion arranged between the recessed portion and an outside surface of the wall portion in the plan view;

the hole portion is defined in the outer wall portion; and the inner wall portion is arranged to have a thickness smaller than a thickness of the outer wall portion.

10. The spindle motor according to claim 9, wherein the upper end portion of the recessed portion is arranged in the wall portion, and is arranged at a level higher than that of a lower end portion of the hole portion.

11. The spindle motor according to claim 10, wherein when a straight line which is tangent to an edge portion of the metal surface on one side and to an edge portion of the hole portion on the one side in a plan view is defined as a first straight line, and a straight line which is tangent to the edge portion of the metal surface on an opposite side and to the edge portion of the hole portion on the opposite side in the plan view is defined as a second straight line;

an area surrounded by the edge portion of the metal surface, the edge portion of the hole portion, the first straight line, and the second straight line is arranged to overlap with at least a portion of the recessed portion in the plan view.

12. The spindle motor according to claim 11, wherein each of the first and second straight lines is arranged to overlap with the recessed portion in the plan view.

13. The spindle motor according to claim 1, wherein an inside of the hole portion includes a screw thread.

14. The spindle motor according to claim 1, wherein the hole portion is a hole in which a pin to position the cover member is arranged.

15. A disk drive apparatus comprising:

the spindle motor of claim 1;

a disk supported by the spindle motor;

an access portion arranged to perform at least one of reading and writing of information from or to the disk;

a cover member attached to the base portion of the spindle motor; and an attaching member arranged to attach the cover member to the base portion of the spindle motor; wherein the cover member includes a sealing portion arranged to be in contact with an upper surface of the wall portion; and the sealing portion is arranged radially inward of the hole portion.

16. The disk drive apparatus according to claim 15, wherein the sealing portion is arranged to axially overlap with the recessed portion.

* * * * *